US009274940B2

(12) United States Patent
Peng

(10) Patent No.: US 9,274,940 B2
(45) Date of Patent: Mar. 1, 2016

(54) METHOD AND APPARATUS FOR ALLOCATING MEMORY SPACE WITH WRITE-COMBINE ATTRIBUTE

(71) Applicant: Huawei Technologies Co., Ltd., Shenzhen, Guangdong (CN)

(72) Inventor: Shengyong Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 124 days.

(21) Appl. No.: 14/102,061

(22) Filed: Dec. 10, 2013

(65) Prior Publication Data

US 2014/0189278 A1   Jul. 3, 2014

Related U.S. Application Data

(63) Continuation of application No. PCT/CN2013/080834, filed on Aug. 5, 2013.

(30) Foreign Application Priority Data

Dec. 27, 2012 (CN) .......................... 2012 1 0578807

(51) Int. Cl.
*G06F 12/02* (2006.01)
(52) U.S. Cl.
CPC ................................. *G06F 12/0223* (2013.01)
(58) Field of Classification Search
None
See application file for complete search history.

(56) References Cited

U.S. PATENT DOCUMENTS

| 8,271,604 | B2 | 9/2012 | Freimuth et al. |
| 2005/0066108 | A1 | 3/2005 | Zimmer et al. |
| 2006/0095609 | A1* | 5/2006 | Radhakrishnan et al. ...... 710/52 |
| 2008/0147959 | A1* | 6/2008 | Freimuth et al. .............. 711/100 |

FOREIGN PATENT DOCUMENTS

| CN | 101206634 A | 6/2008 |
| CN | 101242371 A | 8/2008 |
| CN | 102541654 A | 7/2012 |
| CN | 103019949 A | 4/2013 |

\* cited by examiner

*Primary Examiner* — Jared Rutz
*Assistant Examiner* — Christopher Do

(57) ABSTRACT

Embodiments of the present invention disclose a method and an apparatus for allocating a memory space with a write-combine attribute, including: determining, when resources of devices are scanned, a type and a size of a resource required by each device; determining, after the scanning of the resources of the devices is completed, a total size of write-combine memory spaces required by all first devices; then determining a starting address used to allocate a write-combine memory space to the first devices; and allocating one memory space jointly to all the first devices and allocating, from the one memory space, a sub-memory space to each first device. According to the embodiments of the present invention, a memory space with a write-combine attribute can be allocated to devices in a more reliable manner and by using a relatively simple allocation method.

24 Claims, 7 Drawing Sheets

```
linux-a0fp:~ # cat /proc/mtrr
reg00:base=0x00000000(     0MB), size=32768MB; write-back, count=1
reg01:base=0x800000000(32768MB), size=16384MB; write-back, count=1
reg02:base=0xc00000000(49152MB), size=1024MB; write-back, count=1
reg03:base=0xc0000000(3072MB), size=1024MB; uncachable, count=1
reg04:base=0xbf800000(3064MB), size=   8MB; uncachable, count=1
linux-a0fp:~ #
```

```
linux-z8qs:~ # cat  /proc/mtrr
reg00:base=0x00000000(    0MB), size=  2048MB; write-back, count=1
reg01:base=0x80000000(2048MB), size=1024MB; write-back, count=1
reg02:base=0xc0000000(3072MB), size=256MB; write-back, count=1
reg03:base=0xd0000000(3328MB), size=256MB; write-combining, count=2
reg04:base=0xe0000000(3584MB), size= 512MB; write-back, count=1
reg05:base=0x100000000(4096MB), size= 4096MB; write-back, count=1
reg06:base=0x200000000(8192MB), size= 8192MB; write-back, count=1
reg07:base=0x400000000(16384MB), size=16384MB; write-back, count=1
reg08:base=0x800000000(32768MB), size=16384MB; write-back, count=1
reg09:base=0xc00000000(49152MB), size=1024MB; write-back, count=1
linux-z8qs:~ #
```

FIG. 3

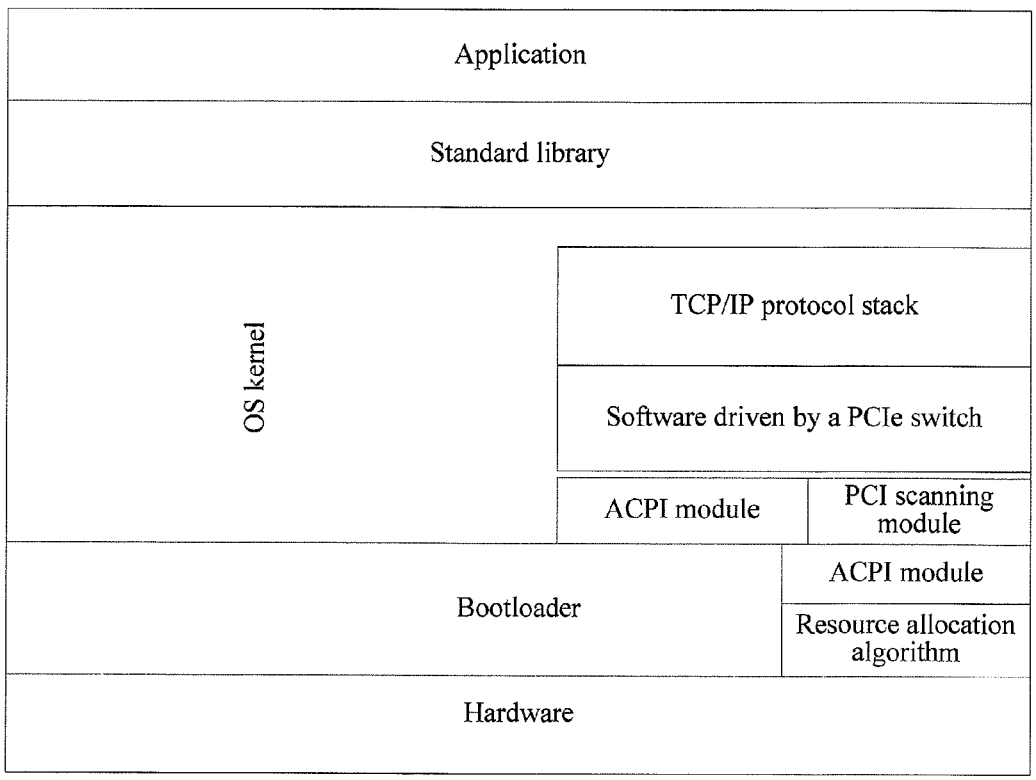

FIG. 4

METHOD AND APPARATUS FOR ALLOCATING MEMORY SPACE WITH WRITE-COMBINE ATTRIBUTE

CROSS-REFERENCE TO RELATED APPLICATIONS

This application is a continuation of International Application No. PCT/CN2013/080834, filed on Aug. 5, 2013, which claims priority to Chinese Patent Application No. 201210578807.4, filed on Dec. 27, 2012, both of which are hereby incorporated by reference in their entireties.

TECHNICAL FIELD

The present invention relates to the communications field, and in particular, to a method and an apparatus for allocating a memory space with a write-combine (WC, Write Combine) attribute.

BACKGROUND

As a solution to device interconnection in a system, the Peripheral Component Interconnect Express (PCIe) bus technology has been very popular. The PCIe bus technology features high performance, low delay, low power consumption, excellent scalability, strong interference immunity, and the like. The current standard has evolved to PCI Express V3.0, and a maximum bus frequency of 8.0 GHz and a data bit width of 32 lanes (lane) may provide a transmission bandwidth up to 8.0*32*2=512 Gbps. In view of the advantages of PCIe transmission, it has currently been used for inter-system interconnection, from which a non-transparent bridge (NTB, None Transparent Bridge) technology is derived.

Refer to FIG. 1, which is a structural diagram of an NTB transmission system that applies the PCIe bus technology in the prior art, and where a specific data flow is marked and data is transmitted between a first system and a second system through a PCIe bus between NT ports (port) of two PCIe switches (Switch).

Referring to FIG. 1, initiating, by the first system, writing data into a memory of the second system may be divided into the following five processes:

Process 1. A first central processing unit (CPU) of the first system acquires data from a first memory module and initiates a memory write request to a first northbridge, where a destination address of the memory write request is an address of a first NT port of a first PCIe switch.

Process 2. After translating the destination address, the first northbridge forms a memory write transaction-layer packet (TLP, Transaction Layer Packet) on a first root complex (RC, Root Complex) module and sends it to the first PCIe switch.

Process 3. After decoding the memory write TLP, the first PCIe switch converts the destination address of the memory write TLP into a corresponding address of a second memory module by using an address translation table on the first NT port and sends the memory write TLP after destination address translation to a second PCIe switch through a second NT port.

Process 4. As an active device, the second PCIe switch sends the memory write TLP to a second northbridge through a second root complex.

Process 5. The second northbridge depacketizes the memory write TLP, converts it into the memory write request, and sends it to the second memory module to complete the memory write task.

In the foregoing processes for writing data into the second memory module, the memory write TLP is generated by the first root complex of the first northbridge and is terminated by the second root complex of the second northbridge. Valid payload (payload) of the memory write TLP remains unchanged all the time, and only a destination address and a source identity (ID) of a packet header change because of address translation on the first NT port.

However, PCIe transmission efficiency=Number of bytes of valid payload/(Number of bytes of valid payload+Header length), a length of the TLP packet header is determined by a type of an access command and cannot be changed, and therefore the larger the valid payload transmitted by the TLP at a time, the higher the transmission efficiency of PCIe is.

In process 1, the length of valid payload carried in the memory write request initiated by the first CPU to the first northbridge determines the valid payload of the memory write TLP assembled by the first root complex on the first northbridge. Unfortunately, when a CPU is used to move data, a memcopy (memcopy) instruction is generally used, and a length of the carried valid payload is only 4 bytes. This point has been proved by capturing, by a logical analyzer, TLPs on a PCIe bus.

The write combining technology may combine data of multiple memcopy instructions, and then the first CPU initiates a first memory write request, sends the data to the first northbridge at a time, thereby achieving the purpose of acquiring relatively large valid payload and improving the PCIe transmission efficiency. The write combining technology may be used when data is written into a memory space with a write-combine attribute, and the data is not temporarily stored and may be internally combined by the CPU as a single write operation, thereby reducing the number of times of memory access. Therefore, setting a memory space of the first NT port of the first PCIe switch to the write-combine attribute may be expected to improve the PCIe transmission efficiency in the first system shown in FIG. 1. Completed tests show that: When the write combining technology is not used, valid payload of the memory write TLP is only 4 bytes; and after the write combining technology is used, valid payload of the memory write TLP may be changed into a length of a cacheline, that is, 128 bytes. After the write combining technology is used on a known model, the entire transmission performance improves by two times, and the PCIe transmission efficiency improves by about four times.

However, currently, it is a relatively tough problem to allocate a memory space with a write-combine attribute to an NT port of a PCIe switch.

In an existing method for allocating a memory space with a write-combine attribute, the write-combine attribute is added to a memory space of a device by modifying, by a user in a manual manner on an operating system, a memory type range register (MTRR, Memory Type Range Register) attribute table.

However, modifications made to the MTRR attribute table must follow a rule, for example, a size of a memory must strictly be an integral power of 2, or a starting address of the memory must be aligned with a limit of the size of the memory, and this may cause, when the write-combine attribute is added to a memory space of a certain device, damage to a starting address and a memory size of another memory space subsequent to the memory space, and as a result, the another memory space subsequent to the memory space must be re-split. However, an algorithm for re-allocating the subsequent memory space is complex and not easy to implement; in addition, a method for re-allocating the subsequent memory space that meets the foregoing rule cannot always be found, and therefore, the method for manually modifying an attribute of the memory space of the device to the write-combine attribute is not reliable.

SUMMARY

Embodiments of the present invention provide a method and an apparatus for allocating a memory space with a write-combine attribute, so as to allocate a memory space with a write-combine attribute to a device in a more reliable manner and by using a relatively simple allocation method.

According to a first aspect, the embodiments of the present invention provides a method for allocating a memory space with a write-combine attribute, including:

determining, when resources of devices are scanned, a type and a size of a resource required by each device, where the type includes a write-combine memory space;

after the scanning of the resources of the devices is completed, determining, according to a size of a write-combine memory space required by each first device, a total size of write-combine memory spaces required by all first devices, where the first devices are devices whose resource types include the write-combine memory space; and determining a starting address used to allocate a write-combine memory space to the first devices, where the starting address is located subsequent to memory spaces allocated to memory modules and a non-write-combine memory space allocated to the devices; and allocating, from the starting address, one memory space jointly to all the first devices according to the total size, and allocating, from the memory space, a sub-memory space to each first device according to the size of the write-combine memory space required by each first device.

With reference to the first aspect, in a first possible implementation manner, the method further includes:

for each first device, writing a starting address of the sub-memory space corresponding to the first device into a write-combine base address register of the first device, where the write-combine base address register refers to a base address register corresponding to the write-combine memory space;

writing address information of the one memory space into a write-combine base address register and a write-combine limit register on an RC, where the write-combine base address register refers to a base address register corresponding to the write-combine memory space, and the write-combine limit register refers to a limit register corresponding to the write-combine memory space; and setting the one memory space to the write-combine attribute.

With reference to the first aspect and/or the first possible implementation manner, in a second possible implementation manner, the determining a type of a resource required by each device includes:

checking a write-combine attribute flag bit of a device when it is determined that a resource required by the device is a memory space; and determining whether the type of the resource of the device is a write-combine memory space according to the write-combine attribute flag bit.

With reference to the second possible implementation manner, in a third possible implementation manner, at least one bit in the third to the sixth bits in a base address register of the device is preset to the write-combine attribute flag bit of the device; and the checking a write-combine attribute flag bit of a device includes: checking the write-combine attribute flag bit in the base address register of the device.

With reference to the first aspect, the first possible implementation manner, the second possible implementation manner, and/or the third possible implementation manner, in a fourth possible implementation manner, after the scanning of the resources of all the devices is completed and before one memory space is allocated jointly to all the first devices, the method further includes:

determining whether a total size of free memory spaces subsequent to the starting address is not less than the total size of the write-combine memory spaces required by all the first devices; and when it is determined that the total size of the free memory spaces subsequent to the starting address is not less than the total size of the write-combine memory spaces required by all the first devices, performing the step of allocating one memory space jointly to all the first devices.

With reference to the first aspect, the first possible implementation manner, the second possible implementation manner, the third possible implementation manner, and/or the fourth possible implementation manner, in a fifth possible implementation manner, the determining a starting address used to allocate the write-combine memory space to the first devices includes:

acquiring a pre-stored memory address and using the memory address as the starting address; or according to the maximum address decoding range supported by a CPU, using an address corresponding to a preset ratio of the maximum address decoding range as the starting address; or using a memory address that is subsequent to a memory space corresponding to a high address memory module and a preset length away from the memory space corresponding to the high address memory module as the starting address.

With reference to the first aspect, the first possible implementation manner, the second possible implementation manner, the third possible implementation manner, the fourth possible implementation manner, and/or the fifth possible implementation manner, in a sixth possible implementation manner, after the one memory space is allocated jointly to all the first devices and before address information of the one memory space is written into a write-combine base address register and a write-combine limit register on an RC, the method further includes:

adjusting a size of the one memory space according to a rule of an integral power of 2; and adjusting a starting address of the one memory space according to an address alignment rule.

With reference to the first aspect, the first possible implementation manner, the second possible implementation manner, the third possible implementation manner, the fourth possible implementation manner, the fifth possible implementation manner, and/or the sixth possible implementation manner, in a seventh possible implementation manner, the setting the one memory space to the write-combine attribute includes:

calling an interface provided by an operating system, and marking, through the interface, an attribute corresponding to the one memory space in the CPU as the write-combine attribute; or calling an interface provided by a BIOS, and marking, through the interface, an attribute corresponding to the one memory space in the CPU as the write-combine attribute.

According to a second aspect, the embodiments of the present invention provides an apparatus for allocating a memory space with a write-combine attribute, including:

a first determining unit, configured to, when resources of devices are scanned, determine a type and a size of a resource required by each device, where the type includes a write-combine memory space;

a second determining unit, configured to, after the scanning of the resources of the devices is completed, determine, according to a size of a write-combine memory space required by each first device, a total size of write-combine memory spaces required by all first devices, where the first devices are devices whose resource types include the write-combine memory space;

a third determining unit, configured to determine a starting address used to allocate a write-combine memory space to the first devices, where the starting address is located subsequent to memory spaces allocated to memory modules and a non-write-combine memory space allocated to each device; and an allocating unit, configured to allocate, from the starting address, one memory space jointly to all the first devices according to the total size, and allocate, from the one memory space, a sub-memory space to each first device according to the size of the write-combine memory space required by each first device.

With reference to the second aspect, in a first possible implementation manner, the method further includes:

a first writing unit, configured to, for each first device, write a starting address of the sub-memory space corresponding to the first device into a write-combine base address register of the first device, where the write-combine base address register refers to a base address register corresponding to the write-combine memory space;

a second writing unit, configured to write address information of the one memory space into a write-combine base address register and a write-combine limit register on an RC, where the write-combine base address register refers to a base address register corresponding to the write-combine memory space, and the write-combine limit register refers to a limit register corresponding to the write-combine memory space; and a declaring unit, configured to set the one memory space to the write-combine attribute.

With reference to the second aspect and/or the first possible implementation manner, in a second possible implementation manner, the first determining unit is specifically configured to:

check a write-combine attribute flag bit of a device when it is determined that a resource required by the device is a memory space; and determine whether the type of the resource of the device is a write-combine memory space according to the write-combine attribute flag bit.

With reference to the second possible implementation manner, in a third possible implementation manner, at least one bit in the third to the sixth bits in a base address register of the device is preset to the write-combine attribute flag bit of the device; and the first determining unit implements the checking of the write-combine attribute flag bit of the device in the following manner: checking the write-combine attribute flag bit in the base address register of the device.

With reference to the second aspect, the first possible implementation manner, the second possible implementation manner, and/or the third possible implementation manner, in a fourth possible implementation manner, the method further includes:

a determining unit, configured to, after the scanning of the resources of all devices is completed and before one memory space is allocated jointly to all the first devices, determine whether a total size of free memory spaces subsequent to the starting address is not less than the total size of the write-combine memory spaces required by all the first devices, where:

correspondingly, the allocating unit is specifically configured to: when the determining unit determines that the total size of the free memory spaces subsequent to the starting address is not less than the total size of the write-combine memory spaces required by all the first devices, allocate, from the starting address, the one memory space jointly to all the first devices according to the total size, and allocate, from the one memory space, a sub-memory space to each first device according to the size of the resource required by each first device.

With reference to the second aspect, the first possible implementation manner, the second possible implementation manner, the third possible implementation manner, and/or the fourth possible implementation manner, in a fifth possible implementation manner, the third determining unit is specifically configured to:

acquire a pre-stored memory address and use the memory address as the starting address; or according to the maximum address decoding range supported by a CPU, use an address corresponding to a preset ratio of the maximum address decoding range as the starting address; or use a memory address that is subsequent to a memory space corresponding to a high address memory module and a preset length away from the memory space corresponding to the high address memory module as the starting address.

With reference to the second aspect, the first possible implementation manner, the second possible implementation manner, the third possible implementation manner, the fourth possible implementation manner, and/or the fifth possible implementation manner, in a sixth possible implementation manner, the allocating unit is further configured to: after the one memory space is allocated jointly to all the first devices, adjust a size of the one memory space according to a rule of an integral power of 2 and adjust a starting address of the one memory space according to an address alignment rule.

With reference to the second aspect, the first possible implementation manner, the second possible implementation manner, the third possible implementation manner, the fourth possible implementation manner, the fifth possible implementation manner, and/or the sixth possible implementation manner, in a seventh possible implementation manner, the declaring unit is specifically configured to:

call an interface provided by an operating system, and mark, through the interface, an attribute corresponding to the one memory space in the CPU as the write-combine attribute; or call an interface provided by a BIOS, and mark, through the interface, an attribute corresponding to the one memory space in the CPU as the write-combine attribute.

According to a third aspect, the embodiments of the present invention provides a system, including a CPU, a memory, and a data transmission bus, where data is transmitted between the CPU and the memory through the data transmission bus, and the CPU includes:

a first determining unit, configured to, when resources of devices are scanned, determine a type and a size of a resource required by each device, where the type includes a write-combine memory space;

a second determining unit, configured to, after the scanning of the resources of the devices is completed, determine, according to a size of a write-combine memory space required by each first device, a total size of write-combine memory spaces required by all first devices, where the first devices are devices whose resource types include the write-combine memory space;

a third determining unit, configured to determine a starting address used to allocate a write-combine memory space to the first devices, where the starting address is located subsequent to memory spaces allocated to memory modules and a non-write-combine memory space allocated to each device; and an allocating unit, configured to allocate, from the starting address, one memory space jointly to all the first devices according to the total size, and allocate, from the one memory space, a sub-memory space to each first device according to the size of the write-combine memory space required by each first device.

With reference to the third aspect, in a first possible implementation manner, the CPU further includes:

a first writing unit, configured to, for each first device, write a starting address of the sub-memory space corresponding to the first device into a write-combine base address register of the first device, where the write-combine base address register refers to a base address register corresponding to the write-combine memory space;

a second writing unit, configured to write address information of the one memory space into a write-combine base address register and a write-combine limit register on an RC, where the write-combine base address register refers to a base address register corresponding to the write-combine memory space, and the write-combine limit register refers to a limit register corresponding to the write-combine memory space; and a declaring unit, configured to set the one memory space to the write-combine attribute.

With reference to the third aspect and/or the first possible implementation manner, in a second possible implementation manner, the first determining unit is specifically configured to:

check a write-combine attribute flag bit of a device when it is determined that a resource required by the device is a memory space; and determine whether the type of the resource of the device is a write-combine memory space according to the write-combine attribute flag bit.

With reference to the second possible implementation manner, in a third possible implementation manner, at least one bit in the third to the sixth bits in a base address register of the device is preset to the write-combine attribute flag bit of the device; and the first determining unit implements the checking of the write-combine attribute flag bit of the device in the following manner: checking the write-combine attribute flag bit in the base address register of the device.

With reference to the third aspect, the first possible implementation manner, the second possible implementation manner, and/or the third possible implementation manner, in a fourth possible implementation manner, the method further includes:

a determining unit, configured to, after the scanning of the resources of all devices is completed and before one memory space is allocated jointly to all the first devices, determine whether a total size of free memory spaces subsequent to the starting address is not less than the total size of the write-combine memory spaces required by all the first devices, where:

correspondingly, the allocating unit is specifically configured to: when the determining unit determines that the total size of the free memory spaces subsequent to the starting address is not less than the total size of the write-combine memory spaces required by all the first devices, allocate, from the starting address, the one memory space jointly to all the first devices according to the total size, and allocate, from the one memory space, a sub-memory space to each first device according to a size of a resource required by each first device.

With reference to the third aspect, the first possible implementation manner, the second possible implementation manner, the third possible implementation manner, and/or the fourth possible implementation manner, in a fifth possible implementation manner, the third determining unit is specifically configured to:

acquire a pre-stored memory address and use the memory address as the starting address; or according to the maximum address decoding range supported by a CPU, use an address corresponding to a preset ratio of the maximum address decoding range as the starting address; or use a memory address that is subsequent to a memory space corresponding to a high address memory module and a preset length away from the memory space corresponding to the high address memory module as the starting address.

With reference to the third aspect, the first possible implementation manner, the second possible implementation manner, the third possible implementation manner, the fourth possible implementation manner, and/or the fifth possible implementation manner, in a sixth possible implementation manner, the allocating unit is further configured to: after the one memory space is allocated jointly to all the first devices, adjust a size of the one memory space according to a rule of an integral power of 2 and adjust a starting address of the one memory space according to an address alignment rule.

With reference to the third aspect, the first possible implementation manner, the second possible implementation manner, the third possible implementation manner, the fourth possible implementation manner, the fifth possible implementation manner, and/or the sixth possible implementation manner, in a seventh possible implementation manner, the declaring unit is specifically configured to:

call an interface provided by an operating system, and mark, through the interface of the operating system, an attribute corresponding to the one memory space in the CPU as the write-combine attribute; or call an interface provided by a BIOS, and mark, through the BIOS interface, an attribute corresponding to the one memory space in the CPU as the write-combine attribute.

In the embodiments of the present invention, a type and a size of a resource required by each device is determined when resources of devices are scanned, where the type includes a write-combine memory space; after the scanning of the resources of the devices is completed, a total size of write-combine memory spaces required by all first devices is determined according to a size of a memory space required by each first device, where the first devices are devices whose resource types include the write-combine memory space; in addition, a starting address used to allocate a write-combine memory space to the first devices is determined, where the starting address is located subsequent to memory spaces allocated to memory modules and a non-write-combine memory space allocated to the devices; and one memory space is allocated, from the starting address, jointly to all the first devices according to the total size, and a sub-memory space is allocated, from the one memory space, to each first device according to the size of the write-combine memory space required by each first device. Because the starting address is located subsequent to the memory spaces allocated to the memory modules and the non-write-combine memory space allocated to each device. This ensures that a memory space allocated to devices whose resource types is a write-combine memory is located subsequent to the memory spaces of the memory modules and the memory spaces with a non-write-combine attribute, and therefore a memory space with another attribute and the memory spaces of the memory modules are not affected when an attribute of the memory space is set to the write-combine attribute; in addition, one memory space is allocated jointly to all the first devices, it only needs to consider that the one memory space meets modification rules when the one memory space is set to the write-combine attribute, and as a result, an algorithm for setting the memory space to the write-combine attribute is simple, easy to implement, and more reliable.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3 is a second example of an MTRR attribute table;

FIG. 4 is a schematic diagram of a relationship between a first system and a BIOS;

DETAILED DESCRIPTION

It should be noted that: A bootloader (bootloader), such as a basic input/output system (BIOS, Basic Input/Output System) or an extensible firmware interface (EFI, Extensible Firmware Interface), is a program stored in a memory, for example, an erasable programmable read-only memory (EPROM, Erasable Programmable ROM) or an electrically erasable programmable read-only memory (EEPROM, Electrically Erasable Programmable ROM); an operating system is also a program stored in a certain memory, for example, a hard disk; and the operating system and the BIOS are run by a CPU. An executor in the embodiments of the present invention is described as a BIOS, a bootloader, an operating system, or the like, so as to distinguish which program is executed by the CPU to implement specific processing in a step.

A method for allocating, by the BIOS, a memory space with a write-combine attribute to a device in the prior art includes the following main steps:

Step 1: The BIOS allocates a memory space to a PCIe device and writes a starting address of the memory space into a base address register (BAR, Base Address Register) of the device. An attribute of the memory space is usually set to uncacheable (uncacheable) herein. In addition, a set size of the required memory space has been stored in the base address register of the device, and therefore it is only required herein that the starting address of the memory space be written into the base address register of the device.

Step 2: An operating system records a result of memory space allocation performed by the BIOS.

Step 3: The operating system maintains an attribute table of memory spaces in the entire system. For example, a Linux system records, in a /proc/mtrr attribute table, an attribute of each memory space allocated to each device.

Step 4: Query, according to the attribute table, a memory space corresponding to an NT port, and then manually modify the attribute of the memory space to the write-combine attribute.

Figures 1, 2:
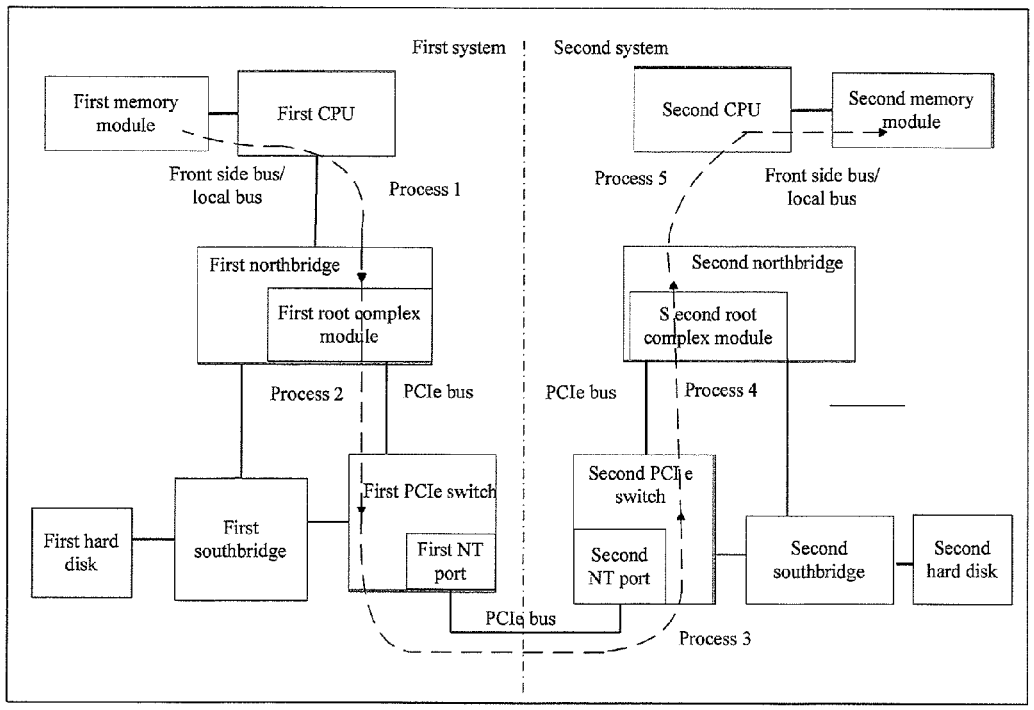
FIG. 1 is a schematic structural diagram of an NTB transmission system.
FIG. 2 is a first example of an MTRR attribute table.

An MTRR attribute table is used as an example. Refer to FIG. 2, which is an MTRR attribute table of a system displayed on a general server after a certain PCIe card is inserted. The MTRR attribute table is formed by attribute records of multiple memory spaces.

One line in the MTRR attribute table indicates an attribute configuration of one memory space. The foregoing figure shows that the system includes five memory spaces. Using a memory space reg01 as an example, meanings of fields are explained as follows:

Reg01: sequence number of an attribute record of the memory space;

Base=0x800000000: A starting address of the memory space is base;

Size=16384 MB: The size of the memory space is 16384 M bytes, where 1M=1024*1024;

Write-back: The attribute of the memory space is write-back (write-back); and when an attribute of a memory space is write-back, a write instruction sent to the memory space indicates writing into a cache (cache), and it is writing into the memory space only when necessary, for example, flushing the memory; and Count=1: No specific meaning is found.

The following rules must be followed when a modification is made to an attribute of a certain memory space in the MTRR attribute table:

1. A size of a memory space must strictly be an integral power of 2;

2. a starting address of the memory space must be aligned with a limit of the size of the memory space, and in other words, the size of the memory space must be exactly divided by the starting address of the memory space;

3. the number of records of memory space attributes is limited, and the number of records that a user applies the operating system is 10; and 4. only an uncacheable attribute and another memory attribute can jointly match a same memory space, an attribute of the jointly matched memory space is uncacheable and other attributes of the memory space are overwritten. For example, in the foregoing figure, a memory space with a base=0xbf800000 and a size=8 MB defined by reg04 and a memory space defined by reg00 are partly overlapped, and an attribute of the part of the memory space (0xbf800000-0xc0000000) is uncacheable.

Because the foregoing rules must be followed and these rules are primarily determined by an internal register of a processor, it becomes very inconvenient to modify an attribute of a memory space of a device. Modifying one memory space to the write-combine attribute may cause damage to a size and a starting address of another memory space subsequent to the memory space, and as a result, the memory space subsequent to the memory space must be re-split, thereby sharply increasing the number of records of memory attributes.

For example, in an MTRR attribute table shown in FIG. 2, a memory space allocated by a BIOS to an NT port of a PCIe switch has a base=0xd0000000 and a size=256 MB; and an MTRR file after a large number of calculations and modifications is shown in FIG. 3, where the number of memory spaces increases from 5 to 10 because of a modification made to the write-combine attribute of reg03, and in the modification process, a large number of calculations are required so as to meet the foregoing modification rules.

In summary, if the memory space with the write-combine attribute is allocated to the NT port by modifying the MTRR attribute table in a manual manner, an algorithm for re-allocating the subsequent memory space is complex and is hard to implement; in addition, a method for re-allocating the subsequent memory space that meets the foregoing rules cannot always be found, and therefore the method for manually modifying the memory space of the device to the write-combine attribute is not reliable.

For this reason, embodiments of the present invention provide a method and an apparatus for allocating a memory space with a write-combine attribute, so as to allocate a memory space with a write-combine attribute to a device, for example, an NT port, in a more reliable manner and by using a relatively simple allocation method.

The method and the apparatus in the present invention may apply to a scenario including a first system and a second system shown in FIG. 1. When a first CPU of the first system writes data into a second memory module of the second system, in the present invention, a BIOS and an operating system described below refer to a BIOS and an operating system that correspond to the first system, and the described device refers to a PCIe device in the first system.

A relationship between the first system shown in FIG. 1 and a bootloader or a relationship between the second system shown in FIG. 1 and the bootloader is shown in FIG. 4. Hardware corresponds to the first system or the second system; the bootloader, such as the BIOS or an EFI, completes resource allocation and register initialization for devices in the hardware system, stores a resource allocation result into an advanced configuration and power interface (ACPI, Advanced Configuration and Power Interface) table, and transmits it to an operating system (OS, Operating System) kernel, for example, a Linux kernel; the OS kernel parses the ACPI table, a PCI scanning module updates a structure of kernel data of a PCI device resource according to a resource configuration in the ACPI table; and software driven by a PCIe switch masks transmission details of an NTB at a lower layer and encapsulates an NT port as a standard network interface card device for a protocol stack.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 5:
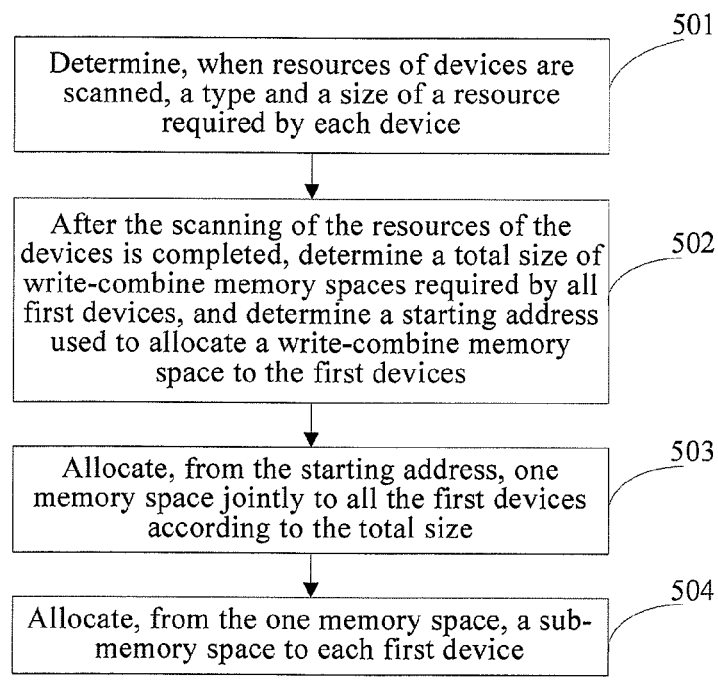
FIG. 5 is a schematic diagram of a first embodiment of a method for allocating a memory space with a write-combine attribute in the present invention.

Refer to FIG. 5, which is a schematic diagram of a first embodiment of a method for allocating a memory space with a write-combine attribute in the present invention. The method includes the following steps:

Step 501: Determine, when resources of devices are scanned, a type and a size of a resource required by each device, where the type includes a write-combine memory space.

The determining a type of a resource required by each device includes: checking a write-combine attribute flag bit of a device when it is determined that a resource required by the device is a memory space; and determining whether the memory required by the device is a write-combine memory space according to the write-combine attribute flag bit.

Preferentially, at least one bit in the third to the sixth bits in a base address register of the device may be preset to the write-combine attribute flag bit of the device. Correspondingly, the checking a write-combine attribute flag bit of a device may include: checking the write-combine attribute flag bit in the base address register of the device.

Step 502: After the scanning of the resources of the devices is completed, determine, according to a size of a write-combine memory space required by each first device, a total size of write-combine memory spaces required by all first devices, where the first devices are devices whose resource types include the write-combine memory space; and determine a starting address used to allocate a write-combine memory space to the first devices, where the starting address is located subsequent to memory spaces allocated to memory modules and a non-write-combine memory space allocated to each device.

The completing the scanning of the resources of the devices may include: completing scanning of resources of all devices in a system that applies the allocation method, or completing scanning of resources of preset devices that require resource scanning in a system that applies the allocation method, or the like. Details about how to represent that the scanning of the resources of the devices is completed may be determined according to practical application situations, and no further details are provided herein.

Each device may require not only one type of resources, for example, it may concurrently require a write-combine memory space and an uncacheable memory space or concurrently require a write-combine memory space and an IO resource.

Step 503: Allocate, from the starting address, one memory space jointly to all the first devices according to the total size.

After the scanning is completed and before one memory space is allocated jointly to all the first devices, the method may further includes:

determining whether a total size of free memory spaces subsequent to the starting address is not less than the total size of the write-combine memory spaces required by all the first devices; and when it is determined that the total size of the free memory spaces subsequent to the starting address is not less than the total size of the write-combine memory spaces required by all the first devices, performing the step of allocating one memory space jointly to all the first devices.

Step 504: Allocate, from the one memory space, a sub-memory space to each first device according to the size of the write-combine memory space required by each first device.

No limitations are set herein on how to allocate, from the one memory space, a sub-memory space to each first device as long as the size of the write-combine memory space required by each first device is met.

Figure 5A:
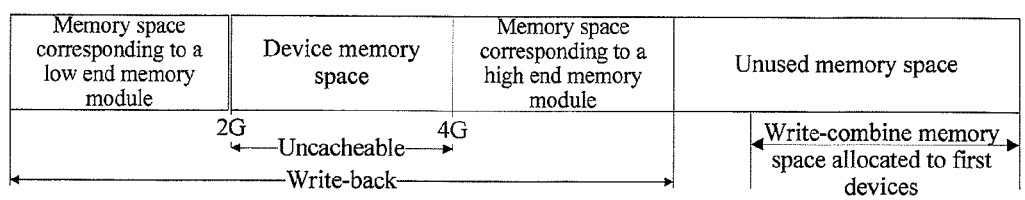
FIG. 5A is an example of a structure of a memory space of a system.

Description about step 502-step 504 is as follows:

As shown in FIG. 5A, a memory space of a system may generally be divided into the following four parts: a memory space corresponding to a low address memory module, a device memory space, a memory space corresponding to a high address memory module, and an unused memory space. In certain systems that do not have a high address memory module, a memory space corresponding to a high address memory module does not exist, and only the other three parts are included. In addition, when a BIOS allocates a memory space to a device, allocation is generally performed within an address range of 2G-4G.

In the prior art, write-combine memory spaces allocated by a BIOS to first devices are also located in the device memory space and mix with memory spaces with a non-write-combine attribute that are allocated by the BIOS to the devices. Therefore, if an attribute of a memory space of a first device is modified to a write-combine attribute, this may affect memory spaces subsequent to the memory space.

In this embodiment of the present invention, however, the starting address used to allocate a write-combine memory space to the first devices is located subsequent to the memory spaces allocated to the memory modules and the non-write-combine memory space allocated to each device, that is, being located in the unused memory space, thereby ensuring that free memory spaces are subsequent to the memory space jointly allocated to all the first devices in step 503, and there are no memory spaces with another attribute that are allocated to the devices or memory spaces allocated to the memory modules, and therefore another memory space is not affected when an attribute of the memory space jointly allocated to all the first devices is subsequently modified to the write-combine attribute, that is, there is no need to modify an attribute, such as a starting address, an ending address, and a space size, of the another memory space.

In addition, all the first devices are jointly allocated with one memory space in step 503, so that when the memory space is declared to have the write-combine attribute, it only needs to consider that the one memory space meets the foregoing modification rules, where the processing process is simple, the calculation amount is small, and the implementation is easy compared with the prior art.

In this embodiment, one memory space is allocated jointly to all first devices from a starting address according to a total size of write-combine memory spaces required by the first devices; a sub-memory space is allocated to each first device from the one memory space according to a size of a write-combine memory space required by each first device; the starting address is located subsequent to memory spaces allocated to memory modules and a non-write-combine memory space allocated to each device. This ensures that free memory spaces are subsequent to the memory space allocated to the first devices and there are no memory spaces allocated to the memory modules or memory spaces with a non-write-combine attribute that are allocated to the devices, therefore memory spaces of another memory and memory module of a device are not affected when an attribute of the one memory space is declared to be a write-combine attribute; in addition, one memory space is allocated jointly to all the first devices, there are no memory spaces subsequent to the memory space, and it only needs to consider that the one memory space meets the foregoing modification rules when the one memory space is declared to have the write-combine attribute, and therefore an algorithm for declaring the memory space to have the write-combine attribute is simple, easy to implement, and more reliable.

Figure 6:
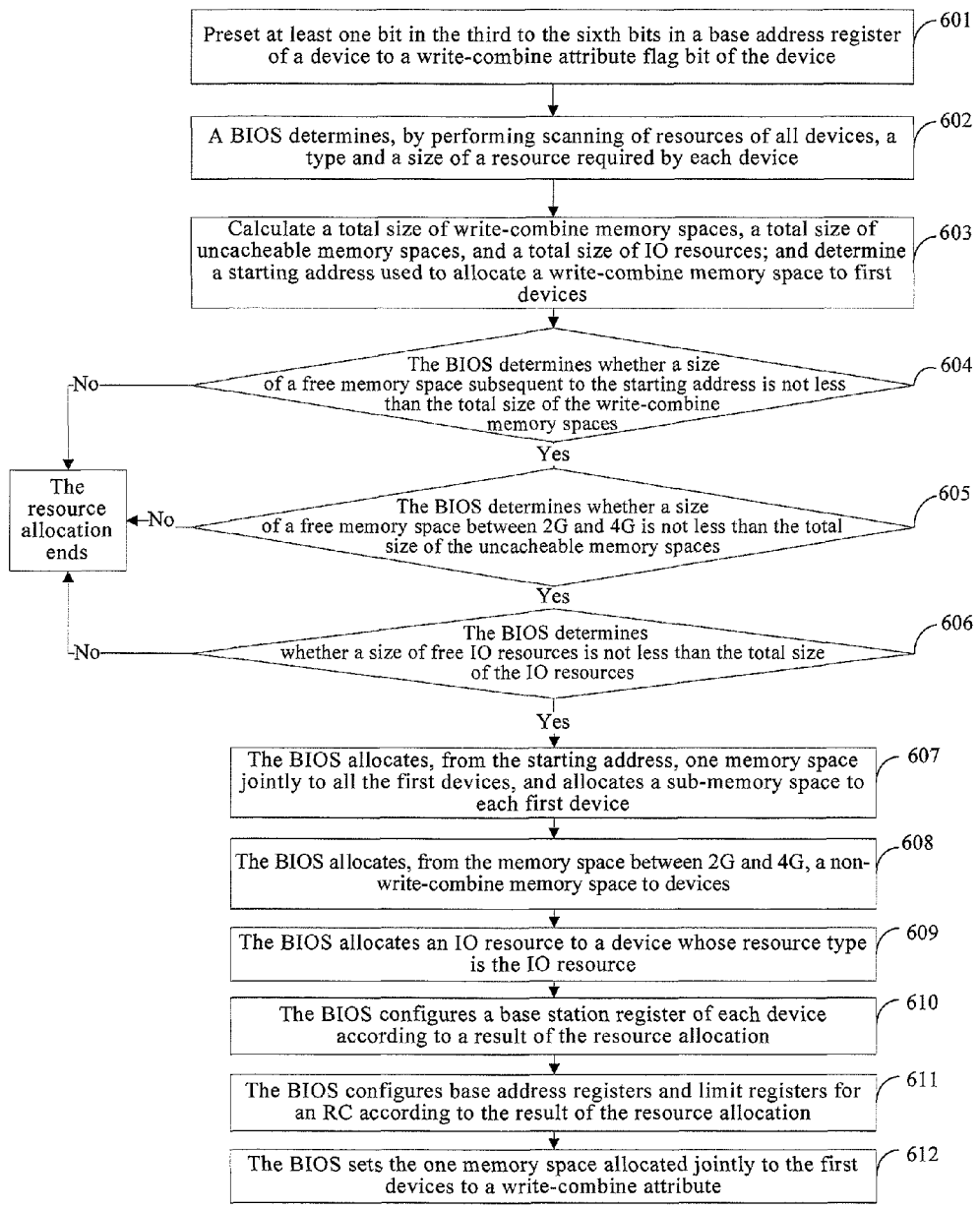
FIG. 6 is a schematic diagram of a second embodiment of a method for allocating a memory space with a write-combine attribute in the present invention.

Refer to FIG. 6, which is a schematic diagram of a second embodiment of a method for allocating a memory space with a write-combine attribute in the present invention. A BIOS serving as a bootloader is used as an example in the method. The method includes the following steps:

Step 601: Preset at least one bit in the third to the sixth bits in a base address register of a device to a write-combine attribute flag bit of the device.

Figure 6A:
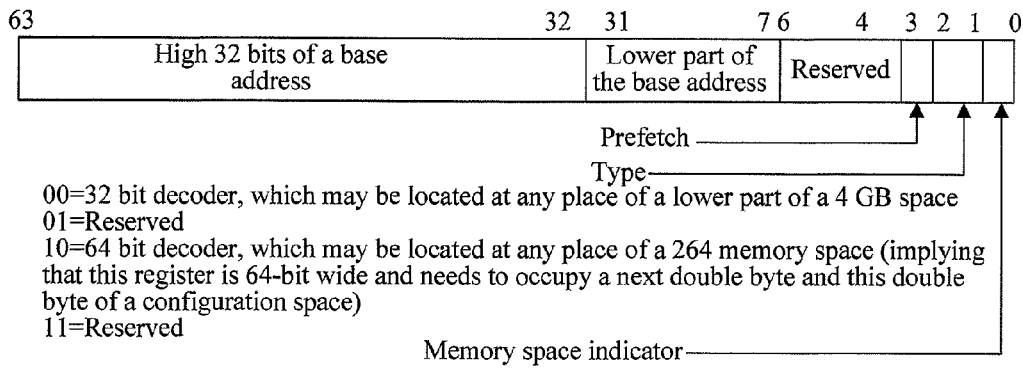
FIG. 6A is a schematic structural diagram of a base address register on a device.

As shown in FIG. 6A, bit0-bit3 in the base address register of the device are internal hard connection lines of chip logic according to a PCIe protocol, are read-only and cannot be written, and declare a requirement of the device for a system resource, where:

Bit0 is an indicator of a memory space, bit0 set to 0 indicates a memory space, and bit0 set to 1 indicates an I/O space;

Bit1-bit2 are used to indicate a decoding manner of a device, bit2 set to 1 and bit1 set to 0 indicate that the device performs decoding according to 64 bits, and if a device that requires a resource whose type is a write-combine memory space is allocated with a high memory space of more than 4G in this embodiment, it needs to declare that the decoding is performed according to the 64 bits; and Bit3 is a prefetch indicator. Bit3 indicates that a memory area of a device may be accessed according to a cache line when it is accessed. As specified in the PCI/PCIe protocol, a device that supports prefetch definitely supports write combining.

Bit4-bit6 are reserved bits and not defined, an uncertain result is generated for writing or reading of these bits, and generally, 0b is returned for reading and invalid for writing.

Preferentially, one bit in bit4-bit6, for example, bit4, may be used as the write-combine attribute flag bit in this step to indicate that this device needs to apply for a memory space with a write-combine attribute. In this case, for the device that requires a resource whose type is a write-combine memory space, for reading the base address register of the device, bit6:0 returns 0011100b; and for writing into the base address register of the device, bit6:0 does not have any change.

Alternatively, preferentially, bit3, a prefetch bit, may also be used as the write-combine attribute flag bit in this step to indicate that this device supports prefetch and meanwhile needs to apply for a memory space with a write-combine attribute. For reading the base address register of the device, bit6:0 returns 0001100b; and for writing into the base address register of the device, bit6:0 does not have any change.

Certainly, this step may also be implemented in other manners, and no further details are provided herein.

Generally, when at least one bit in the third to the sixth bits in the base address register of the device is preset to the write-combine attribute flag bit of the device in this step, a specific value of the write-combine attribute flag bit may be directly written into the base address register of the device during production of the device.

Step 602: The BIOS determines, by performing scanning of resources of all devices, a type and a size of a resource required by each device.

The type of the resource may include: a write-combine memory space, an uncacheable memory space, and an input/output (IO) resource. The write-combine memory space refers to a memory space with a write-combine attribute, and the uncacheable memory space refers to a memory space with an uncacheable attribute.

Figure 7:
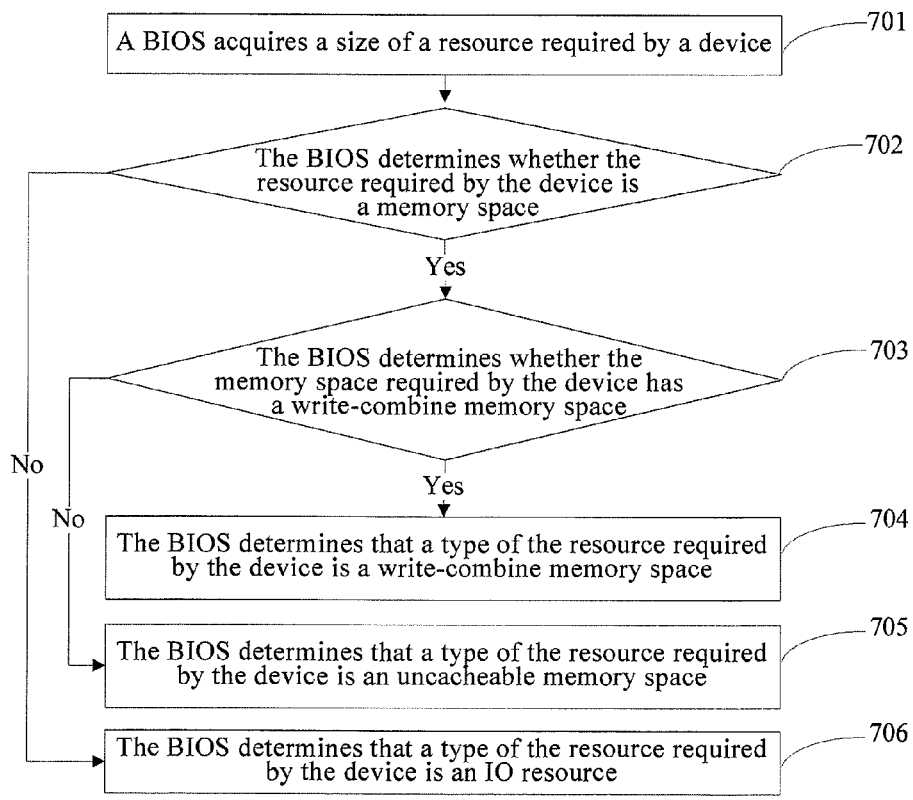
FIG. 7 is a flowchart of a method for scanning, by a BIOS, device resources in the present invention.

Referring to FIG. 7, the following steps may be included when a resource of each device is scanned:

Step 701: The BIOS acquires a size of a resource required by a device.

As shown in FIG. 6A, the size of the resource required by the device is generally stored in a lower part of a base address in a base address register of the device, and therefore in this step, the BIOS may directly read the size of the resource required by the device from the lower part of the base address in the base address register of the device.

Step 702: The BIOS determines whether the resource required by the device is a memory space, and if yes, performs step 703; and if no, performs step 706.

If the resource required by the device is not a memory space, this indicates that the resource required by the device is an IO resource.

Referring to FIG. 6A, bit0 in the base address register of the device is a memory space indicator, and therefore in step 702, whether the resource required by the device is a memory space may be determined according to bit0 in the base address register of the device.

Step 703: The BIOS determines whether the memory space required by the device has a write-combine attribute, and if it has the write-combine attribute, performs step 704; and if it does not has the write-combine attribute, which indicates that the memory space has an uncacheable attribute, performs step 705.

Referring to FIG. 6A and step 601, the write-combine attribute flag bit is set in the base address register of the device, and therefore in step 703, whether the memory space required by the device has the write-combine attribute may be determined according to the write-combine attribute flag bit.

Step 704: The BIOS determines that a type of the resource required by the device is a write-combine memory space.

Step 705: The BIOS determines that a type of the resource required by the device is an uncacheable memory space.

Step 706: The BIOS determines that a type of the resource required by the device is an IO resource.

In step 602, when performing the scanning of the resources of all the devices, the BIOS may sequentially scan a resource of each device and may also concurrently scan resources of multiple devices, and no limitations are set herein.

Step 603: The BIOS separately calculates a total size of write-combine memory spaces, a total size of uncacheable memory spaces, and a total size of IO resources required by the devices; and the BIOS determines a starting address used to allocate a write-combine memory space to first devices, where the starting address is located subsequent to memory spaces allocated to memory modules and a non-write-combine memory space allocated to each device.

The determining, by the BIOS, a starting address used to allocate a write-combine memory space to first devices may include:

(1) Acquire a pre-stored memory address and use the memory address as the starting address.

For example, a memory address may be pre-stored, and in this step, the BIOS directly reads the pre-stored memory address and uses it as the starting address, where the memory address should also be located subsequent to memory spaces allocated to other devices except the first devices and allocated to the memory modules.

Generally, as shown in FIG. 5A, the pre-stored memory address should also be located subsequent to a memory space corresponding to the high address memory module, for example, 0xC000000000.

Alternatively, (2) according to the maximum address decoding range supported by a CPU, use an address corresponding to a preset ratio of the maximum address decoding range as the starting address.

The BIOS may acquire, by checking a model of the CPU, the maximum address decoding range supported by the CPU, for example, certain CPUs support 36 bit address decoding, and the maximum address decoding range supported by the CPUs is 64 GB; and certain CPUs support 40 bit address decoding, and the maximum address decoding range supported by the CPUs is 1 TB. According to the maximum address decoding range supported by the CPU, the BIOS may use the address corresponding to the preset ratio, for example, 3/4, of the maximum address decoding range as the starting address.

Alternatively, (3) use a memory address that is subsequent to the memory space corresponding to the high address memory module and a preset length away from the memory space corresponding to the high address memory module as the starting address.

Generally, a memory module is initialized before a PCIe device is initialized, and the BIOS may allocate a corresponding resource to the PCIe device only after a memory space is allocated to the memory module. Therefore, one address that is subsequent to the memory space corresponding to the high address memory module may be selected as the starting address according to the memory spaces allocated to the memory modules. For details about how to select the one address as the starting address, no limitations are set herein.

Step 604: The BIOS determines whether a size of a free memory space subsequent to the starting address is not less than the total size of the write-combine memory spaces required by the devices, and if yes, performs step 605; otherwise, resource allocation ends.

Step 605: The BIOS determines whether a size of a free memory space between 2G and 4G is not less than the total size of the uncacheable memory spaces, and if yes, performs step 606; otherwise, resource allocation ends.

Currently, the BIOS generally allocates a memory space between 2G and 4G to each device as a memory space required by the device. However, the present invention does not set a limitation to a specific location of the memory space, and a memory address range between 2G and 4G is only exemplary.

Step 606: The BIOS determines whether a size of free 10 resources is not less than the total size of the IO resources, and if yes, performs step 607; otherwise, resource allocation ends.

Step 607: The BIOS allocates, from the starting address, one memory space jointly to all the first devices and allocates, from the one memory space, a sub-memory space to each first device according to a size of a resource required by each first device.

Step 607 may further include: adjusting a size of the one memory space according to a rule of an integral power of 2; and adjusting a starting address of the one memory space according to an address alignment rule.

For example, the size of the one memory space is 15 MB, and the starting address is 0xC0000000; then, 15 MB needs to be adjusted to 32 MB (25 power of 2) according to the rule of an integral power of 2; according to the address alignment rule, the starting address should be an integral multiple of the size of the memory space, 0xC0000000 is exactly an integral multiple of 32 MB, and therefore the starting address is still 0xC0000000. A result of the adjustment is as follows: The starting address is 0xC0000000, and the size is 32 MB.

For details about how to implement adjustment of the size and the starting address of the memory space during implementation, no limitations are set herein, and it is only required that the one memory space allocated to all the first devices meet the rule of an integral power of 2 and the address alignment rule.

Step 608: The BIOS allocates, from the memory space between 2G and 4G, a non-write-combine memory space required by the devices to the devices.

In this embodiment of the present invention, a resource type is a non-write-combine memory space, that is, a resource type is an uncacheable memory.

Step 609: The BIOS allocates an IO resource to a device whose resource type is the IO resource.

No limitations are set to an order in which step 607-step 609 are performed.

Step 610: The BIOS configures a base station register of each device according to a result of the resource allocation.

Specifically, a starting address of the write-combine memory space allocated to a device is written into a write-combine base address register of the device, and a starting address of the uncacheable memory space allocated to a device is written into a base address register corresponding to the uncacheable memory space of the device. For a device whose resource type is an IO resource, information about the IO resource allocated to the device is written into a base address register corresponding to the IO resource of the device.

A device generally includes multiple base address registers, there may be up to 6 base address registers currently, each base address register records a type of resources required by the device, and a size of this type of resources is pre-stored in the base address registers. In this embodiment of the present invention, one base address register corresponding to a write-combine memory space, namely, the write-combine base address register, may be set on the device to record information about a write-combine memory space required by the device. Because a size of the write-combine memory space required by the device has been stored in the write-combine base address register, only the starting address of the write-combine memory space, that is, the starting address of a sub-memory space allocated to the device, needs to be written in this step; and certainly, in specific implementation, an ending address of the write-combine memory space may further be written, and no limitations are set herein.

Step 611: The BIOS configures base address registers and limit registers for an RC according to the result of the resource allocation.

A memory base address register and a memory limit register, an IO base address register and an IO limit register, a prefetch (prefetch) base address register and a prefetch limit register, and the like are set on the RC.

For a device whose resource type is an uncacheable memory space, a starting address and an ending address of a memory space allocated to the device are written into the memory base address register and the memory limit register on the RC, respectively; and for a device whose resource type is an IO resource, information about the IO resource allocated to the device is written into the IO base address register and the IO limit register on the RC.

In this embodiment of the present invention, a write-combine base address register and a write-combine limit register further need to be set on the RC, where the write-combine base address register refers to a base address register corresponding to a write-combine memory space, and the write-combine limit register refers to a limit register corresponding to the write-combine memory space. The write-combine base address register is configured to store the starting address of the one memory space allocated jointly to all the first devices, and the write-combine limit register is configured to store an ending address of the one memory space.

In this step, the starting address of the one memory space allocated to all the first devices is written into the write-combine base address register, and the ending address is written into the write-combine limit register. Preferentially, the write-combine base address register and the write-combine limit register may be implemented by adding a new base address register and limit register to the RC, or the prefetch base address register and the prefetch limit register may also be used as the write-combine base address register and the write-combine limit register.

Step 612: The BIOS sets the one memory space allocated jointly to the first devices to the write-combine attribute.

An interface is generally set on the BIOS and an attribute of a certain memory space in the CPU may be modified through the interface. In this step, the BIOS calls the interface and marks the attribute corresponding to the one memory space in the CPU as the write-combine attribute.

Setting the one memory space allocated jointly to the first devices to the write-combine attribute may be executed by a bootloader, such as the BIOS and an EFI, and may also be executed by an operating system. When it is executed by an operating system, the operating system calls an interface preset on the operating system, may access the write-combine base address register and limit register on the RC through the interface, acquires a starting address and an ending address of a write-combine memory space, and marks, according to the starting address and the ending address, an attribute of a corresponding memory space in the CPU as the write-combine attribute.

Preferentially, the setting the one memory space to the write-combine attribute may include:

calling, by the operating system, the interface provided by the operating system, and marking, through the interface, the attribute corresponding to the one memory space in the CPU as the write-combine attribute; or calling, by the BIOS, the interface provided by the BIOS, and marking, through the interface, the attribute corresponding to the one memory space in the CPU as the write-combine attribute.

In this embodiment, a process where the BIOS allocates the memory space to the first devices is combined with a process where the BIOS allocates other memory spaces and IO resources to the devices, thereby implementing allocation of resources to all the devices. In addition, this also makes the method for allocating a memory space with a write-combine attribute in this embodiment of the present invention compatible with an existing algorithm for the BIOS to perform resource scanning and allocation.

Figure 8:
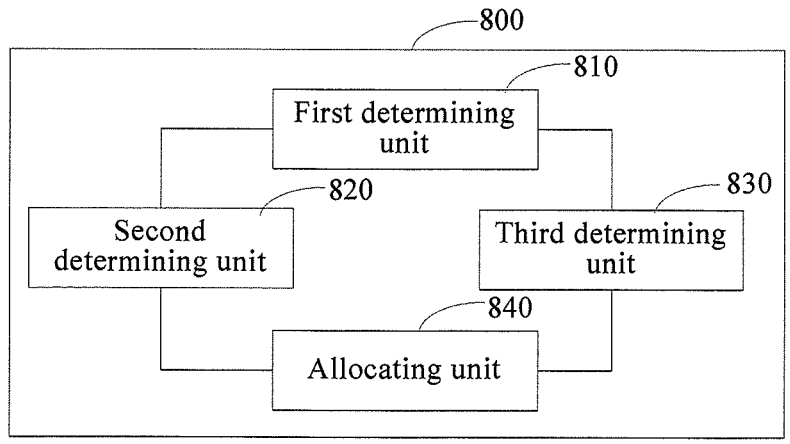
FIG. 8 is a schematic diagram of a first embodiment of an apparatus for allocating a memory space with a write-combine attribute in the present invention.

Corresponding to the foregoing method, an embodiment of the present invention further provides an apparatus for allocating a memory space with a write-combine attribute. Referring to FIG. 8, the allocating apparatus 800 includes:

a first determining unit 810, configured to determine, when resources of devices are scanned, a type and a size of a resource required by each device, where the type includes a write-combine memory space;

a second determining unit 820, configured to, after the scanning of the resources of all devices is completed, determine, according to a size of a write-combine memory space required by each first device, a total size of write-combine memory spaces required by all first devices, where the first devices are devices whose resource types include the write-combine memory space;

a third determining unit 830, configured to determine a starting address used to allocate a write-combine memory space to the first devices, where the starting address is located subsequent to memory spaces allocated to memory modules and a non-write-combine memory space allocated to the devices; and an allocating unit 840, configured to allocate, from the starting address, one memory space jointly to all the first devices according to the total size, and allocate, from the one memory space, a sub-memory space to each first device according to the size of the write-combine memory space required by each first device.

Figure 8A:
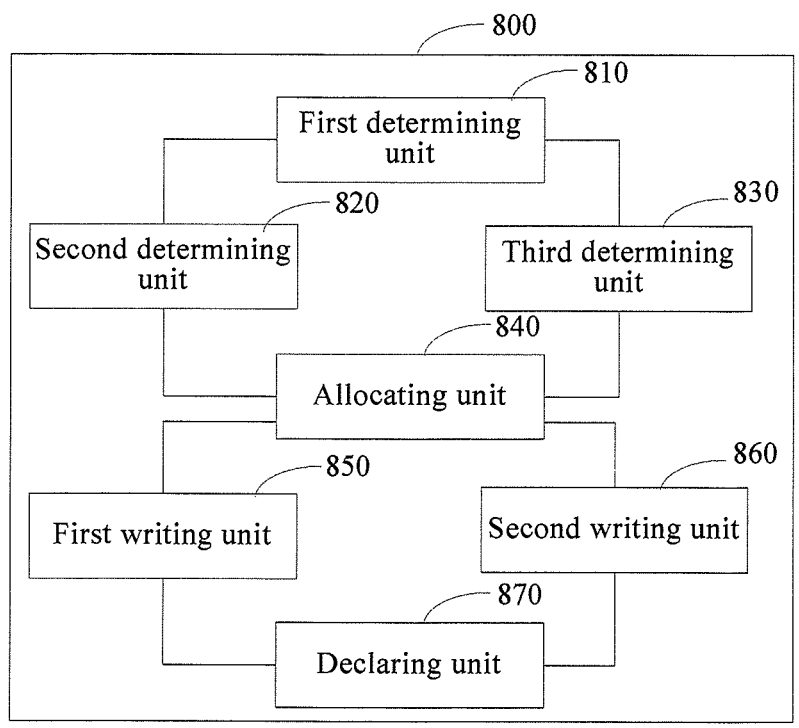
FIG. 8A is a schematic diagram of a second embodiment of an apparatus for allocating a memory space with a write-combine attribute in the present invention.

Preferentially, referring to FIG. 8A, the allocating apparatus 800 may further include:

a first writing unit 850, configured to, for each first device, write a starting address of a sub-memory space corresponding to the first device into a write-combine base address register of the first device, where the write-combine base address register refers to a base address register corresponding to the write-combine memory space;

a second writing unit 860, configured to write address information of the one memory space into a write-combine base address register and a write-combine limit register on an RC, where the write-combine base address register refers to a base address register corresponding to the write-combine memory space, and the write-combine limit register refers to a limit register corresponding to the write-combine memory space; and a declaring unit 870, configured to set the one memory space to the write-combine attribute.

Preferentially, the first determining unit 810 may specifically be configured to: check a write-combine attribute flag bit of a device when it is determined that a resource required by the device is a memory space; and determine whether the type of the resource of the device is a write-combine memory space according to the write-combine attribute flag bit.

Preferentially, at least one bit in the third to the sixth bits in a base address register of the device is preset to the write-combine attribute flag bit of the device.

The first determining unit 810 may specifically implement the checking of the write-combine attribute flag bit of the device in the following manner: checking the write-combine attribute flag bit in the base address register of the device.

Figure 8B:
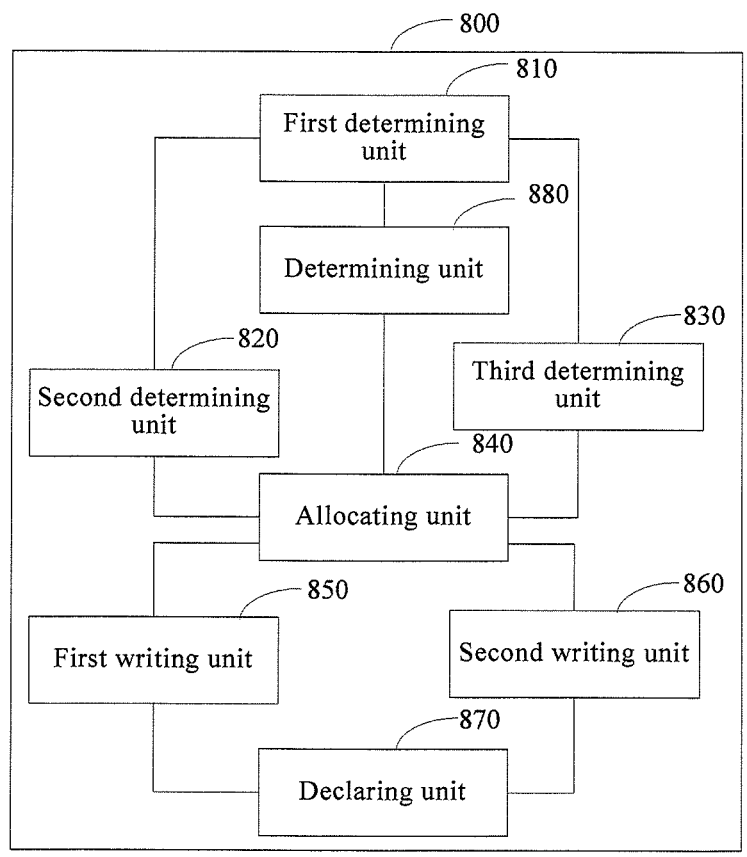
FIG. 8B is a schematic diagram of a third embodiment of an apparatus for allocating a memory space with a write-combine attribute in the present invention.

Preferentially, referring to FIG. 8B, the allocating apparatus 800 may further include:

a determining unit 880, configured to, after the scanning of the resources of all devices is completed and before one memory space is allocated jointly to all the first devices, determine whether a total size of free memory spaces subsequent to the starting address is not less than the total size of the write-combine memory spaces required by all the first devices.

Correspondingly, the allocating unit is specifically configured to: when the determining unit determines that the total size of the free memory spaces subsequent to the starting address is not less than the total size of the write-combine memory spaces required by all the first devices, allocate, from the starting address, the one memory space jointly to all the first devices according to the total size, and allocate, from the one memory space, a sub-memory space to each first device according to the size of the resource required by each first device.

Preferentially, the third determining unit 830 may specifically be configured to:

acquire a pre-stored memory address and use the memory address as the starting address; or according to the maximum address decoding range supported by a CPU, use an address corresponding to a preset ratio of the maximum address decoding range as the starting address; or use a memory address that is subsequent to a memory space corresponding to a high address memory module and a preset length away from the memory space corresponding to the high address memory module as the starting address.

Preferentially, the allocating unit 840 may further be configured to: after allocating one memory space jointly to all the first devices, adjust a size of the one memory space according to a rule of an integral power of 2; and adjust a starting address of the one memory space according to an address alignment rule.

Preferentially, the declaring unit 870 may specifically be configured to: call an interface provided by an operating system, and mark, through the interface, an attribute corresponding to the one memory space in the CPU as a write-combine attribute; or call an interface provided by a BIOS, and mark, through the interface, an attribute corresponding to the one memory space in the CPU as the write-combine attribute.

In this embodiment of the present invention, one memory space is allocated jointly to all first devices from a starting address according to a total size of write-combine memory spaces required by the first devices; a sub-memory space is allocated to each first device from the one memory space according to a size of a write-combine memory space required by each first device; the starting address is located subsequent to memory spaces allocated to memory modules and a non-write-combine memory space allocated to each device. This ensures that free memory spaces are subsequent to the memory spaces allocated to the first devices and there are no memory spaces allocated to the memory modules or memory spaces with a non-write-combine attribute that are allocated to the devices, and therefore memory spaces of another memory and memory module of a device are not affected when an attribute of the one memory space is declared to be a write-combine attribute; in addition, one memory space is allocated jointly to all the first devices, there are no memory spaces subsequent to the memory space, it only needs to consider that the one memory space meets the foregoing modification rules when the one memory space is declared to have the write-combine attribute, and therefore an algorithm for declaring the memory space to have the write-combine attribute is simple, easy to implement, and more reliable.

Figure 9:
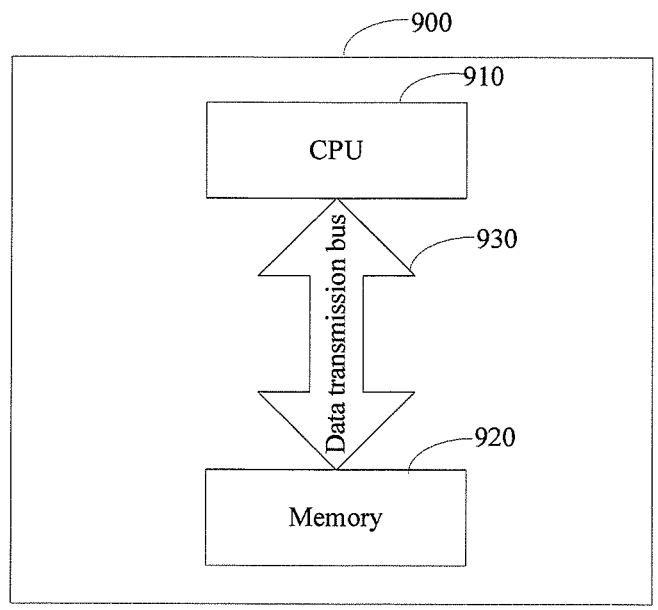
FIG. 9 is a schematic structural diagram of a system according to an embodiment of the present invention.

Referring to FIG. 9, an embodiment of the present invention further provides a system, where the system 900 includes a CPU 910, a memory 920, and a data transmission bus 930, where data is transmitted between the CPU 910 and the memory 920 through the data transmission bus 930.

The memory 920 is configured to store a program. Specifically, the program may include program code, and the program code includes a computer operation instruction. The memory 920 may include a high-speed RAM memory and may further include a non-volatile memory (non-volatile memory), for example, at least one disk memory.

The CPU 910 is configured to: when resources of devices are scanned, determine a type and a size of a resource required by each device, where the type includes a write-combine memory space; after the scanning of the resources of the devices is completed, determine, according to a size of a write-combine memory space required by each first device, a total size of write-combine memory spaces required by all the first devices, where the first devices are devices whose resource types include the write-combine memory space; in addition, determine a starting address used to allocate a write-combine memory space to the first devices, where the starting address is located subsequent to memory spaces allocated to memory modules and a non-write-combine memory space allocated to the devices; and allocate, from the starting address, one memory space jointly to all the first devices according to the total size, and allocate, from the one memory space, a sub-memory space to each first device according to the size of the write-combine memory space required by each first device.

The CPU 910 may further be configured to: for each first device, write a starting address of the sub-memory space corresponding to the first device into a write-combine base address register of the first device, where the write-combine base address register refers to a base address register corresponding to the write-combine memory space; write address information of the one memory space into a write-combine base address register and a write-combine limit register on an RC, where the write-combine base address register refers to a base address register corresponding to the write-combine memory space, and the write-combine limit register refers to a limit register corresponding to the write-combine memory space; and set the one memory space to the write-combine attribute.

Preferentially, the CPU 910 may specifically be configured to determine the type of the resource required by each device in the following manner:

checking a write-combine attribute flag bit of a device when it is determined that a resource required by the device is a memory space; and determining whether a resource type of the device is a write-combine memory space according to the write-combine attribute flag bit.

Preferentially, at least one bit in the third to the sixth bits in a base address register of the device is preset to the write-combine attribute flag bit of the device.

The CPU 910 may specifically be configured to check the write-combine attribute flag bit of the device in the following manner: checking the write-combine attribute flag bit in the base address register of the device.

Preferentially, the CPU 910 may further be configured to: after the scanning of the resources of the devices is completed and before one memory space is allocated jointly to all the first devices, determine whether a total size of free memory spaces subsequent to the starting address is not less than the total size of the write-combine memory spaces required by all the first devices; and when it is determined that the total size of the free memory spaces subsequent to the starting address is not less than the total size of the write-combine memory spaces required by all the first devices, perform the step of allocating one memory space jointly to all the first devices.

Preferentially, the CPU 910 may specifically be configured to determine, in the following manners, the starting address used to allocate a write-combine memory space to the first devices: acquiring a pre-stored memory address, and using the memory space as the starting address; according to the maximum address decoding range supported by the CPU, using an address corresponding to a preset ratio of the maximum address decoding range as the starting address; or using a memory address that is subsequent to a memory space corresponding to a high address memory module and a preset length away from the memory space corresponding to the high address memory module as the starting address.

Preferentially, the CPU 910 may further be configured to: after the one memory space is allocated jointly to all the first devices and before address information of the one memory space is written into the write-combine base address register and the write-combine limit register on the RC, adjust a size of the one memory space according to a rule of an integral power of 2; and adjust a starting address of the one memory space according to an address alignment rule.

Preferentially, the CPU 910 may specifically be configured to set the one memory space to the write-combine attribute in the following manners: calling an interface provided by an operating system, and marking, through the interface, an attribute corresponding to the one memory space in the CPU as the write-combine attribute; or calling an interface provided by a BIOS, and marking, through the interface, an attribute corresponding to the one memory space in the CPU as the write-combine attribute.

Preferentially, the CPU 910 may include:

a first determining unit, configured to, when resources of devices are scanned, determine a type and a size of a resource required by each device, where the type includes a write-combine memory space;

a second determining unit, configured to, after the scanning of the resources of all devices is completed, determine, according to a size of a write-combine memory space required by each first device, a total size of write-combine memory spaces required by all first devices, where the first devices are devices whose resource types include the write-combine memory space;

a third determining unit, configured to determine a starting address used to allocate a write-combine memory space to the first devices, where the starting address is located subsequent to memory spaces allocated to memory modules and a non-write-combine memory space allocated to each device; and an allocating unit, configured to allocate, from the starting address, one memory space jointly to all the first devices according to the total size, and allocate, from the one memory space, a sub-memory space to each first device according to the size of the write-combine memory space required by each first device.

Preferentially, the CPU 910 may further include:

a first writing unit, configured to, for each first device, write a starting address of the sub-memory space corresponding to the first device into a write-combine base address register of the first device, where the write-combine base address register refers to a base address register corresponding to the write-combine memory space;

a second writing unit, configured to write address information of the one memory space into a write-combine base address register and a write-combine limit register on an RC, where the write-combine base address register refers to a base address register corresponding to the write-combine memory space, and the write-combine limit register refers to a limit register corresponding to the write-combine memory space; and a declaring unit, configured to set the one memory space to the write-combine attribute.

Preferentially, the first determining unit may specifically be configured to:

check a write-combine attribute flag bit of a device when it is determined that a resource required by the device is a memory space; and determine whether a resource type of the device is a write-combine memory space according to the write-combine attribute flag bit.

Preferentially, at least one bit in the third to the sixth bits in a base address register of the device is preset to the write-combine attribute flag bit of the device.

The first determining unit may specifically implement the checking of the write-combine attribute flag bit of the device in the following manner: checking the write-combine attribute flag bit in the base address register of the device.

Preferentially, the memory 920 may further include:

a determining unit, configured to, after the scanning of the resources of all devices is completed and before one memory space is allocated jointly to all the first devices, determine whether a total size of free memory spaces subsequent to the starting address is not less than the total size of the write-combine memory spaces required by all the first devices.

Correspondingly, the allocating unit may specifically be configured to: when the determining unit determines that the total size of the free memory spaces subsequent to the starting address is not less than the total size of the write-combine memory spaces required by all the first devices, allocate, from the starting address, one memory space jointly to all the first devices according to the total size, and allocate, from the one memory space, a sub-memory space to each first device according to the size of the resource required by each first device.

Preferentially, the third determining unit may specifically be configured to:

acquire a pre-stored memory address and use the memory address as the starting address; or according to the maximum address decoding range supported by a CPU, use an address corresponding to a preset ratio of the maximum address decoding range as the starting address; or use a memory address that is subsequent to a memory space corresponding to a high address memory module and a preset length away from the memory space corresponding to the high address memory module as the starting address.

Preferentially, the allocating unit may further be configured to: after allocating one memory space jointly to all the first devices, adjust a size of the one memory space according to a rule of an integral power of 2; and adjust a starting address of the one memory space according to an address alignment rule.

Preferentially, the declaring unit may specifically be configured to:

call an interface provided by an operating system, and mark, through the interface of the operating system, an attribute corresponding to the one memory space in the CPU as the write-combine attribute; or call a BIOS interface, and mark, through the BIOS interface, an attribute corresponding to the one memory space in the CPU as the write-combine attribute.

In this embodiment of the present invention, one memory space is allocated jointly from the starting address to all first devices according to a total size of write-combine memory spaces that the first devices require; a sub-memory space is allocated from the one memory space to each first device according to a size of a write-combine memory space required by each first device; the starting address is located subsequent to memory spaces allocated to memory modules and a non-write-combine memory space allocated to each device. This ensures that free memory spaces are subsequent to the memory spaces allocated to the first devices and there are no memory spaces allocated to the memory modules or memory spaces with a non-write-combine attribute that are allocated to the devices, and therefore memory spaces of another memory and memory module of a device are not affected when an attribute of the one memory space is declared to be a write-combine attribute; in addition, one memory space is allocated jointly to all the first devices, there are no memory spaces subsequent to the memory space, it only needs to consider that the one memory space meets the foregoing modification rules when the one memory space is declared to have the write-combine attribute, and therefore an algorithm for declaring the memory space to have the write-combine attribute is simple, easy to implement, and more reliable.

A person skilled in the art may clearly understand that the technique in the embodiments of the present invention may be implemented through software and a necessary general hardware platform. Based on such an understanding, the technical solutions in the embodiments of the present invention essentially, or the part contributing to the prior art may be implemented in a form of a software product. The computer software product is stored in a storage medium, such as an ROM/RAM, a magnetic disk, or an optical disc, and includes several instructions for instructing a computer device (which may be a personal computer, a server, or a network device) to perform the methods described in the embodiments of the present invention or in some parts of the embodiments of the present invention.

The embodiments of the present invention are described in a progressive manner, identical or similar parts in the embodiments may be cross-referenced, and each embodiment emphasizes a part different from other embodiments. In particular, for the system embodiment, because it is basically similar to the method embodiment, it is described in a relatively simple manner, and for the related parts, refer to the part of the description in the method embodiment.

The foregoing embodiments of the present invention are not intended to limit the scope of the present invention. Any modification, equivalent replacement, improvement, or the like made within the spirit and principle of the present invention shall fall within the protection scope of the present invention.

What is claimed is:

1. A method for allocating a memory space with a write-combine attribute, the method comprising:
    determining, when resources of devices are scanned, a type and a size of a resource required by each device, wherein the type comprises a write-combine memory space;
    after the scanning of the resources of the devices is completed, determining, according to a size of a write-combine memory space required by each first device, a total size of write-combine memory spaces required by all first devices, wherein the first devices are devices whose resource types comprise the write-combine memory space; and determining a starting address used to allocate a write-combine memory space to the first devices, wherein the starting address is located subsequent to memory spaces allocated to memory modules and a non-write-combine memory space allocated to the devices; and
    allocating, from the starting address, one memory space jointly to all the first devices according to the total size, and allocating, from the one memory space, a sub-memory space to each first device according to the size of the write-combine memory space required by each first device.

2. The method according to claim 1, further comprising:
    for each first device, writing a starting address of the sub-memory space corresponding to the first device into a write-combine base address register of the first device, wherein the write-combine base address register refers to a base address register corresponding to the write-combine memory space;
    writing address information of the one memory space into a write-combine base address register and a write-combine limit register on a root complex (RC), wherein the write-combine base address register refers to a base address register corresponding to the write-combine memory space, and the write-combine limit register refers to a limit register corresponding to the write-combine memory space; and
    setting the one memory space to the write-combine attribute.

3. The method according to claim 1, wherein determining a type of a resource required by each device comprises:
  checking a write-combine attribute flag bit of a device when it is determined that a resource required by the device is a memory space; and
  determining whether the type of the resource of the device is a write-combine memory space according to the write-combine attribute flag bit.

4. The method according to claim 3, wherein at least one bit in the third to the sixth bits in a base address register of the device is preset to the write-combine attribute flag bit of the device; and
  checking a write-combine attribute flag bit of a device comprises: checking the write-combine attribute flag bit in the base address register of the device.

5. The method according to claim 1, after the scanning of the resources of the devices is completed and before one memory space is allocated jointly to all the first devices, further comprising:
  determining whether a total size of free memory spaces subsequent to the starting address is not less than the total size of the write-combine memory spaces required by all the first devices; and
  when it is determined that the total size of the free memory spaces subsequent to the starting address is not less than the total size of the write-combine memory spaces required by all the first devices, performing the step of allocating one memory space jointly to all the first devices.

6. The method according to claim 1, wherein determining a starting address used to allocate the write-combine memory space to the first devices comprises:
  acquiring a pre-stored memory address and using the memory address as the starting address; or
  according to the maximum address decoding range supported by a CPU, using an address corresponding to a preset ratio of the maximum address decoding range as the starting address; or
  using a memory address that is subsequent to a memory space corresponding to a high address memory module and a preset length away from the memory space corresponding to the high address memory module as the starting address.

7. The method according to claim 1, after the one memory space is allocated jointly to all the first devices and before the address information of the one memory space is written into the write-combine base address register and the write-combine limit register on the RC, further comprising:
  adjusting a size of the one memory space according to a rule of an integral power of 2; and adjusting a starting address of the one memory space according to an address alignment rule.

8. The method according to claim 1, wherein setting the one memory space to a write-combine attribute comprises:
  calling an interface provided by an operating system, and marking, through the interface, an attribute corresponding to the one memory space in a central processing unit (CPU) as the write-combine attribute; or
  calling an interface provided by a basic input/output system (BIOS), and marking, through the interface, an attribute corresponding to the one memory space in the CPU as the write-combine attribute.

9. An apparatus for allocating a memory space with a write-combine attribute, the apparatus comprising:
  a memory storing instructions; and
  a processor coupled to the memory, wherein when the processor executes the instructions, the instructions instruct the processor to:
  determine, when resources of devices are scanned, a type and a size of a resource required by each device, wherein the type comprises a write-combine memory space;
  after the scanning of the resources of the devices is completed, determine, according to a size of a write-combine memory space required by each first device, a total size of write-combine memory spaces required by all first devices, wherein the first devices are devices whose resource types comprise the write-combine memory space;
  determine a starting address used to allocate a write-combine memory space to the first devices, wherein the starting address is located subsequent to memory spaces allocated to memory modules and a non-write-combine memory space allocated to each device; and
  allocate, from the starting address, one memory space jointly to all the first devices according to the total size, and allocate, from the one memory space, a sub-memory space to each first device according to the size of the write-combine memory space required by each first device.

10. The apparatus according to claim 9, wherein the processor is further instructed to:
  for each first device, write a starting address of the sub-memory space corresponding to the first device into a write-combine base address register of the first device, wherein the write-combine base address register refers to a base address register corresponding to the write-combine memory space;
  write address information of the one memory space into a write-combine base address register and a write-combine limit register on a root complex (RC), wherein the write-combine base address register refers to a base address register corresponding to the write-combine memory space, and the write-combine limit register refers to a limit register corresponding to the write-combine memory space; and
  set the one memory space to the write-combine attribute.

11. The apparatus according to claim 9, wherein the processor is further instructed to:
  check a write-combine attribute flag bit of a device when it is determined that a resource required by the device is a memory space; and
  determine whether the type of the resource of the device is a write-combine memory space according to the write-combine attribute flag bit.

12. The apparatus according to claim 11, wherein at least one bit in the third to the sixth bits in a base address register of the device is preset to the write-combine attribute flag bit of the device; and
  the processor is instructed to check the write-combine attribute flag bit in the base address register of the device.

13. The apparatus according to claim 9, wherein the processor is further instructed to:
  after the scanning of the resources of all devices is completed and before one memory space is allocated jointly to all the first devices, determine whether a total size of free memory spaces subsequent to the starting address is not less than the total size of the write-combine memory spaces required by all the first devices, wherein:
  correspondingly, the processor instructed to: when the determined that the total size of the free memory spaces subsequent to the starting address is not less than the total size of the write-combine memory spaces required by all the first devices, allocate, from the starting address, the one memory space jointly to all the first devices according to the total size, and allocate, from the one memory space, a sub-memory space to each first device according to the size of the resource required by each first device.

14. The apparatus according to claim 9, wherein the processor is further instructed to:
acquire a pre-stored memory address and use the memory address as the starting address; or
according to the maximum address decoding range supported by a CPU, use an address corresponding to a preset ratio of the maximum address decoding range as the starting address; or
use a memory address that is subsequent to a memory space corresponding to a high address memory module and a preset length away from the memory space corresponding to the high address memory module as the starting address.

15. The apparatus according to claim 9, wherein the processor is further instructed to: after allocating the one memory space jointly to all the first devices, adjust a size of the one memory space according to a rule of an integral power of 2; and adjust a starting address of the one memory space according to an address alignment rule.

16. The apparatus according to claim 9, wherein the processor is further instructed to:
call an interface provided by an operating system, and mark, through the interface, an attribute corresponding to the one memory space in a central processing unit (CPU) as the write-combine attribute; or
call an interface provided by a basic input/output system (BIOS), and mark, through the interface, an attribute corresponding to the one memory space in the CPU as the write-combine attribute.

17. A system, comprising a central processing unit (CPU), a memory, and a data transmission bus, wherein data is transmitted between the CPU and the memory through the data transmission bus, and the CPU is configured to:
determine, when resources of devices are scanned, a type and a size of a resource required by each device, wherein the type comprises a write-combine memory space;
after the scanning of the resources of the devices is completed, determine, according to a size of a write-combine memory space required by each first device, a total size of write-combine memory spaces required by all first devices, wherein the first devices are devices whose resource types comprise the write-combine memory space;
determine a starting address used to allocate a write-combine memory space to the first devices, wherein the starting address is located subsequent to memory spaces allocated to memory modules and a non-write-combine memory space allocated to each device; and
allocate, from the starting address, one memory space jointly to all the first devices according to the total size, and allocate, from the one memory space, a sub-memory space to each first device according to the size of the write-combine memory space required by each first device.

18. The system according to claim 17, wherein the CPU is further configured to:
for each first device, write a starting address of the sub-memory space corresponding to the first device into a write-combine base address register of the first device, wherein the write-combine base address register refers to a base address register corresponding to the write-combine memory space;
write address information of the one memory space into a write-combine base address register and a write-combine limit register on a root complex (RC), wherein the write-combine base address register refers to a base address register corresponding to the write-combine memory space, and the write-combine limit register refers to a limit register corresponding to the write-combine memory space; and
set the one memory space to the write-combine attribute.

19. The system according to claim 17, wherein the CPU is configured to:
check a write-combine attribute flag bit of a device when it is determined that a resource required by the device is a memory space; and
determine whether the type of the resource of the device is a write-combine memory space according to the write-combine attribute flag bit.

20. The system according to claim 19, wherein at least one bit in the third to the sixth bits in a base address register of the device is preset to the write-combine attribute flag bit of the device; and
the CPU is further configured to check the write-combine attribute flag bit in the base address register of the device.

21. The system according to claim 17, wherein the CPU is further configured to:
after the scanning of the resources of all devices is completed and before one memory space is allocated jointly to all the first devices, determine whether a total size of free memory spaces subsequent to the starting address is not less than the total size of the write-combine memory spaces required by all the first devices, wherein:
correspondingly, the CPU is further configured to: when it is determined that the total size of the free memory spaces subsequent to the starting address is not less than the total size of the write-combine memory spaces required by all the first devices, allocate, from the starting address, the one memory space jointly to all the first devices according to the total size, and allocate, from the one memory space, a sub-memory space to each first device according to a size of a resource required by each first device.

22. The system according to claim 17, wherein the CPU is configured to:
acquire a pre-stored memory address and use the memory address as the starting address; or
according to the maximum address decoding range supported by a CPU, use an address corresponding to a preset ratio of the maximum address decoding range as the starting address; or
use a memory address that is subsequent to a memory space corresponding to a high address memory module and a preset length away from the memory space corresponding to the high address memory module as the starting address.

23. The system according to claim 17, wherein the CPU is further configured to: after allocating the one memory space jointly to all the first devices, adjust a size of the one memory space according to a rule of an integral power of 2; and adjust a starting address of the one memory space according to an address alignment rule.

24. The system according to claim 17, wherein the CPU is configured to:

call an interface provided by an operating system, and mark, through the interface of the operating system, an attribute corresponding to the one memory space in the CPU as the write-combine attribute; or call an interface provided by a basic input/output system (BIOS), and mark, through the BIOS interface, an attribute corresponding to the one memory space in the CPU as the write-combine attribute.

\* \* \* \* \*